US012682438B2

(12) United States Patent
Daneshjou et al.

(10) Patent No.: US 12,682,438 B2
(45) Date of Patent: Jul. 14, 2026

(54) SYSTEMS AND METHODS FOR AUTOMATED CLINICAL IMAGE QUALITY ASSESSMENT

(71) Applicant: The Board of Trustees of the Leland Stanford Junior University, Stanford, CA (US)

(72) Inventors: Roxana Daneshjou, Stanford, CA (US); Kailas Vodrahalli, Stanford, CA (US); James Zou, Stanford, CA (US); Justin Ko, Stanford, CA (US); Roberto A. Novoa, San Francisco, CA (US); Albert Chiou, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 706 days.

(21) Appl. No.: 17/937,714

(22) Filed: Oct. 3, 2022

(65) Prior Publication Data

US 2023/0107485 A1     Apr. 6, 2023

Related U.S. Application Data

(60) Provisional application No. 63/374,494, filed on Sep. 2, 2022, provisional application No. 63/251,527, filed on Oct. 1, 2021.

(51) Int. Cl.
*G06T 7/00*        (2017.01)
*G06V 10/42*      (2022.01)
*G06V 10/764*    (2022.01)

(52) U.S. Cl.
CPC ............ *G06T 7/0002* (2013.01); *G06V 10/42* (2022.01); *G06V 10/764* (2022.01); *G06T 2207/20081* (2013.01); *G06T 2207/30168* (2013.01)

(58) Field of Classification Search
CPC ......... G06T 7/0002; G06T 2207/20081; G06T 2207/30168; G06V 10/42; G06V 10/764
USPC ...................................................... 382/206
See application file for complete search history.

(56) References Cited

U.S. PATENT DOCUMENTS

| | | | |
|---|---|---|---|
| 7,689,016 B2 | 3/2010 | Stoecker et al. | |
| 8,811,724 B2 * | 8/2014 | Nielsen ................. | G06T 7/0012 |
| | | | 382/128 |

OTHER PUBLICATIONS

Tiba, Attila, et al. "Detecting outlier and poor quality medical images with an ensemble-based deep learning system." 2019 11th International Symposium on Image and Signal Processing and Analysis (ISPA). IEEE, 2019. (Year: 2019).*
Akinbo, Racheal S., and Oladunni A. Daramola. "Ensemble machine learning algorithms for prediction and classification of medical images." Algorithms, Models and Applications (2021): 59. (Year: 2021).*

(Continued)

*Primary Examiner* — Jonathan S Lee
(74) *Attorney, Agent, or Firm* — KPPB LLP

(57)                ABSTRACT

Embodiments herein describe systems and methods for automated clinical image quality assessment and uses thereof are provided. Many embodiments provide instructions and feedback for clinically relevant image quality. Several embodiments provide methods to generate a model to assess image quality.

19 Claims, 10 Drawing Sheets

(56) References Cited

OTHER PUBLICATIONS

"SkinIO Launches Teledermatology App to Combat Poor Photo Quality Amid COVID-19 Telemedicine Surge", Cision PRWeb, Apr. 16, 2020, Retrieved from: https://www.prweb.com/releases/skinio_launches_teledermatology_app_to_combat_poor_photo_quality_amid_covid_19_telemedicine_surge/prweb17051333.html, 2 pgs.

Bolya et al., "YOLACT: Real-Time Instance Segmentation", Proceedings of the IEEE/CVF International Conference on Computer Vision (ICCV), arXiv:1904.02689v1 [cs.CV] Apr. 4, 2019, pp. 9156-9165, doi: 10.1109/ICCV.2019.00925.

Bosse et al., "Deep Neural Networks for No-Reference and Full-Reference Image Quality Assessment", IEEE Transactions on Image Processing, vol. 27, No. 1, Jan. 2018, pp. 206-219, doi: 10.1109/TIP.2017.2760518.

Chow et al., "Review of medical image quality assessment", Biomedical Signal Processing and Control, vol. 27, May 2016, pp. 145-154, doi: 10.1016/j.bspc.2016.02.006.

Esteva et al., "Dermatologist-level classification of skin cancer with deep neural networks", Nature, vol. 542, No. 7639, Feb. 2, 2017, pp. 115-118, published online Jan. 25, 2017, doi: 10.1038/nature21056.

Gao et al., "Blind image quality prediction by exploiting multi-level deep representations", Author Accepted Manuscript, Pattern Recognition, vol. 81, Issue C, Sep. 2018, pp. 432-442, doi: 10.1016/j.patcog.2018.04.016.

Guo et al., "A review of semantic segmentation using deep neural networks", International Journal of Multimedia Information Retrieval, vol. 7, No. 2, 2017, pp. 87-93, doi: 10.1007/s13735-017-0141-z.

Krizhevsky et al., "ImageNet Classification with Deep Convolutional Neural Networks", Advances in Neural Information Processing Systems (NIPS), vol. 25, 2012, pp. 1097-1105.

Li et al., "No-Reference Image Blur Assessment Based on Discrete Orthogonal Moments", IEEE Transactions on Cybernetics, vol. 46, No. 1, Jan. 2016, pp. 39-50, doi: 10.1109/tcyb.2015.2392129.

Lin et al., "Hallucinated-IQA: No. Reference Image Quality Assessment via Adversarial Learning", Proceedings of the IEEE/CVF Conference on Computer Vision and Pattern Recognition, Apr. 2018, pp. 732-741, doi: 10.1109/CVPR.2018.00083.

Liu et al., "Image partial blur detection and classification", IEEE Conference on Computer Vision and Pattern Recognition, 2008, pp. 1-8, doi: 10.1109/CVPR.2008.4587465.

Liu et al., "RankIQA: Learning from Rankings for No-Reference Image Quality Assessment", Proceedings of the IEEE International Conference on Computer Vision (ICCV), Jul. 26, 2017, pp. 1040-1049, doi: 10.1109/ICCV.2017.118.

Pertuz et al., "Analysis of focus measure operators for shape-from-focus", Pattern Recognition, vol. 46, No. 5, May 1, 2013, pp. 1415-1432, doi: 10.1016/j.patcog.2012.11.011.

Ulku et al., "A Survey on Deep Learning-based Architectures for Semantic Segmentation on 2D Images", Applied Artificial Intelligence, arXiv:1912.10230v5 [cs.CV] Mar. 16, 2022, vol. 36, 30 pgs., doi: 10.1080/08839514.2022.2032924.

Vodrahalli et al., "TrueImage: A Machine Learning Algorithm to Improve the Quality of Telehealth Photos", Pacific Symposium on Biocomputing, vol. 26, arXiv:2010.02086v1 [cs.CV] Oct. 1, 2020, pp. 220-231, doi: 10.48550/arXiv.2010.02086.

Zhang et al., "A Feature-Enriched Completely Blind Image Quality Evaluator", IEEE Transactions on Image Processing, vol. 24, No. 8, Aug. 2015, pp. 2579-2591, doi: 10.1109/TIP.2015.2426416.

* cited by examiner

SYSTEMS AND METHODS FOR AUTOMATED CLINICAL IMAGE QUALITY ASSESSMENT

CROSS-REFERENCE TO RELATED APPLICATIONS

The current application claims priority to U.S. Provisional Patent Application No. 63/251,527, filed Oct. 1, 2021 and U.S. Provisional Patent Application No. 63/374,494, filed Sep. 2, 2022; the disclosures of which are hereby incorporated by reference in their entireties.

FIELD OF THE INVENTION

The present invention relates to image processing. More specifically, the present invention relates to systems and methods to assist an individual to take images with clinically relevant quality.

BACKGROUND

Due to the SARS-CoV-2 (COVID-19) pandemic, many hospitals have rapidly transitioned patient visits to video conference calls on a digital platform to limit exposure for both patients and healthcare workers. Although these digital visits have some limitations, they have recently accounted for more than 10% of all visits in the US, corresponding to more than an 10,000% increase since February 2020.

The rapid adoption of telehealth has unearthed substantial challenges. For example, productive teledermatology visits require high clinical quality images of the area of concern; however, video call platforms do not have sufficient imaging resolution for diagnosis. In teledermatology, a clinician will often request patients to send in photos of their lesions or rash ahead of time. The clinician will use these images for assessing the patient's condition and use the digital platform of the visit to communicate with a patient rather than for making assessments.

While patients can be guided on how to take pictures of their lesions, it is common for patients to take blurry images, images in poor lighting conditions (e.g., too much glare or too dark), or images that do not adequately show the lesion (e.g., taken from too far away). Prior assessments of image quality in dermatology are not applicable to real world teledermatology, as trained medical professionals took the photos in these studies. A recent, informal survey of dermatologists indicted that up to one-fifth of all images sent by patients are of too low of quality to be of clinical use.

Due to this high percentage of low-quality images, dermatologists or other staff members screen images prior to a visit and request a patient to retake an image when necessary. This process is time consuming and can take a similar amount of time as a regularly scheduled visit. Moreover, it is common for patients to send in images just prior to a visit leaving no time for image quality screening. When these images are low quality, the clinical visit is spent coaching the patient on retaking the photo rather than the clinical issue. Therefore, poor quality images can significantly disrupt a clinician's schedule and affect clinical care.

Dermatology has become an important application of machine learning research in recent years with the success of deep learning and the acquisition of large dermatology datasets. Much of this work is related to disease diagnosis or lesion segmentation, and most public data is taken using dermatoscopes, a special tool for magnifying lesions. However, as large-scale teledermatology is relatively new, little work has been done in solving problems specific to automatically assessing the quality of patient-taken images. Thus, there exists a need for a platform that can assess image quality for clinical relevance and provide immediate feedback to a patient or other individual on how to improve image quality.

SUMMARY OF THE INVENTION

This summary is meant to provide some examples and is not intended to be limiting of the scope of the invention in any way. For example, any feature included in an example of this summary is not required by the claims, unless the claims explicitly recite the features. Various features and steps as described elsewhere in this disclosure may be included in the examples summarized here, and the features and steps described here and elsewhere can be combined in a variety of ways.

In some aspects, the techniques described herein relate to a machine learning model for assessing image quality, including a deep learning model including a linear classifier configured to identify image quality of an image, a classical vision model configured to identify a feature quality in the image, and a logistic classifier configured to provide an image quality as an output.

In some aspects, the techniques described herein relate to a machine learning model, where the deep learning model is a plurality of deep learning models, where one deep learning model provides an overall quality of the image and another deep learning model provides a binary classifier for a feature of the image.

In some aspects, the techniques described herein relate to a machine learning model, where the feature is selected from blur, lighting, and zoom/crop.

In some aspects, the techniques described herein relate to a machine learning model, where the deep learning model is four deep learning models, where the first deep learning model provides an overall quality of the image and the second deep learning model, the third deep learning model, and the fourth deep learning models provide a binary classifier for a feature of the image.

In some aspects, the techniques described herein relate to a machine learning model, where the feature is selected from blur, lighting, and zoom/crop.

In some aspects, the techniques described herein relate to a machine learning model, where the first deep learning model is a gateway classifier.

In some aspects, the techniques described herein relate to a machine learning model, where the classical vision model is a plurality of classical vision models.

In some aspects, the techniques described herein relate to a machine learning model, where the plurality of classical vision models are input selected features.

In some aspects, the techniques described herein relate to a machine learning model, where the features are selected by one or more of local binary pattern, Fourier blur, Laplacian blur, Lighting, skin distribution, image cropping, and color space transform.

In some aspects, the techniques described herein relate to a machine learning model, where the logistic classifier is further configured to provide an explanation for a poor quality image.

In some aspects, the techniques described herein relate to a machine learning model where the deep learning model is four deep learning models, where the first deep learning model provides an overall quality of the image, where the second deep learning model, the third deep learning model, and the fourth deep learning models provide a binary classifier for a feature of the image, where the feature is selected from blur, lighting, and zoom/crop, and where the first deep learning model is a gateway classifier, where the classical vision model is a plurality of classical vision models input selected features, where the features are selected by one or more of local binary pattern, Fourier blur, Laplacian blur, Lighting, skin distribution, image cropping, and color space transform, and where the logistic classifier is configured to provide an explanation for a poor quality image.

In some aspects, the techniques described herein relate to a method for improving image quality for clinical use, including obtaining an image of an area of concern on an individual, providing the image to a machine learning model trained to identify image quality, receiving an image quality rating for the image from the machine learning model.

In some aspects, the techniques described herein relate to a method, where the area of concern is a skin lesion.

In some aspects, the techniques described herein relate to a method, further including obtaining a second image of the area of concern based on the image quality rating from the machine learning model, providing the second image to the machine learning model, and receiving an image quality rating for the second image from the machine learning model.

In some aspects, the techniques described herein relate to a method, where the machine learning model includes a deep learning model including a linear classifier configured to identify image quality of the image, a classical vision model configured to identify a feature quality in the image, and a logistic classifier configured to provide an image quality as an output.

In some aspects, the techniques described herein relate to a machine learning model, where the deep learning model is a plurality of deep learning models, where one deep learning model provides an overall quality of the image and another deep learning model provides a binary classifier for a feature of the image.

In some aspects, the techniques described herein relate to a machine learning model, where the feature is selected from blur, lighting, and zoom/crop.

In some aspects, the techniques described herein relate to a machine learning model, where the deep learning model is four deep learning models, where the first deep learning model provides an overall quality of the image and the second deep learning model, the third deep learning model, and the fourth deep learning models provide a binary classifier for a feature of the image.

In some aspects, the techniques described herein relate to a machine learning model, where the feature is selected from blur, lighting, and zoom/crop.

In some aspects, the techniques described herein relate to a machine learning model, where the first deep learning model is a gateway classifier.

In some aspects, the techniques described herein relate to a machine learning model, where the classical vision model is a plurality of classical vision models.

In some aspects, the techniques described herein relate to a machine learning model, where the plurality of classical vision models are input selected features.

In some aspects, the techniques described herein relate to a machine learning model, where the features are selected by one or more of local binary pattern, Fourier blur, Laplacian blur, Lighting, skin distribution, image cropping, and color space transform.

In some aspects, the techniques described herein relate to a machine learning model, where the logistic classifier is further configured to provide an explanation for a poor quality image.

Other features and advantages of the present invention will become apparent from the following detailed description, taken in conjunction with the accompanying drawings which illustrate, by way of example, the principles of the invention.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
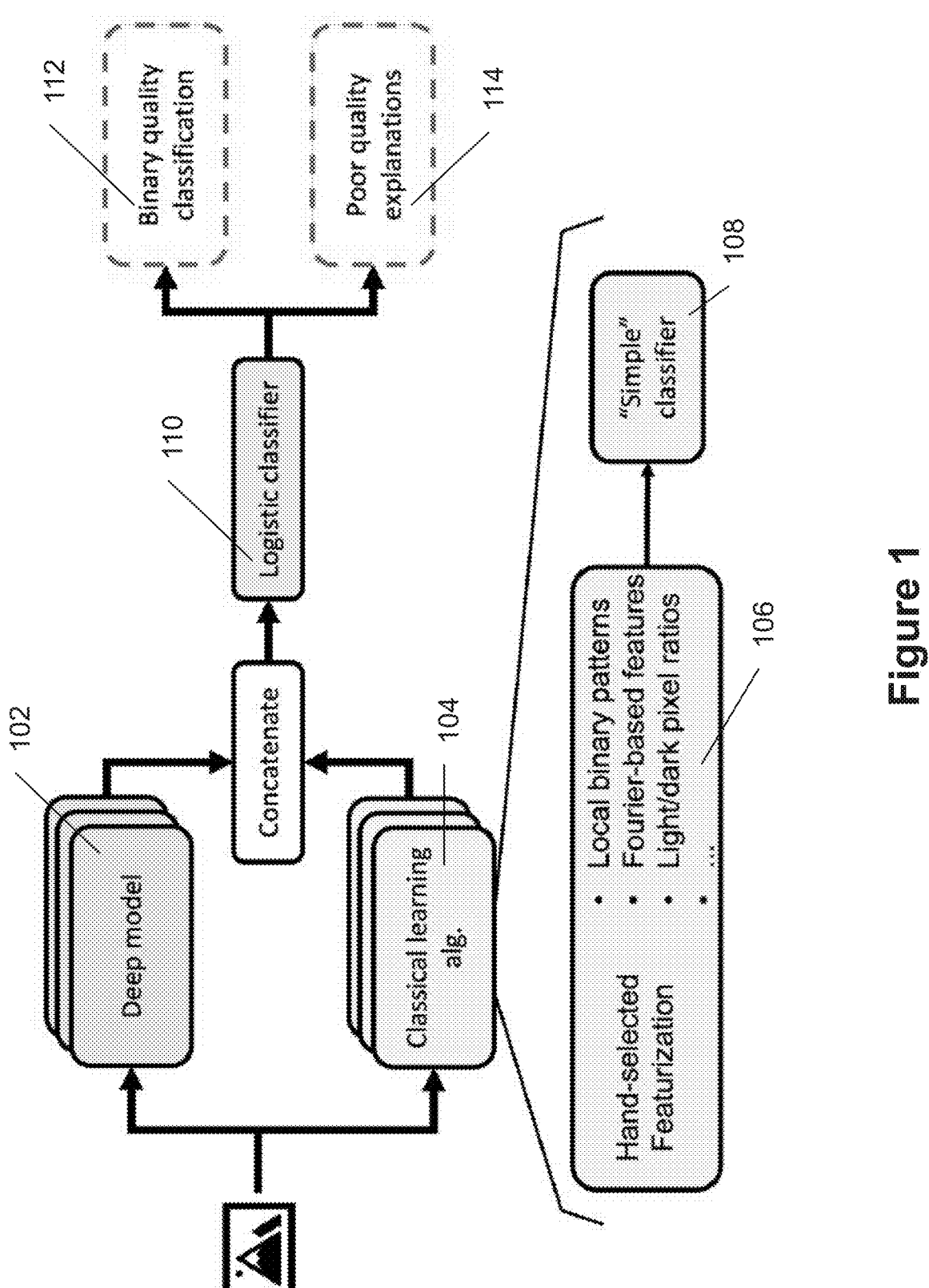
FIG. 1 illustrates an exemplary schematic of a machine learning model in accordance with various embodiments of the invention.

Remote clinical care (telemedicine) uses digital means to facilitate a clinical visit. Visits can happen in real time over video call or asynchronously, with patients submitting images to be reviewed later. Skin conditions are prevalent with an estimated one in three Americans experiencing skin disease at any given time. Both primary care physicians and dermatologists use telemedicine to assess skin conditions due to the visibility of the condition.

Video quality is generally insufficient for assessing skin disease, so patients are often asked to submit photographs (e.g., of their lesion or rash). Most clinical photo-taking applications primarily rely on the patient's judgment for submitting adequate quality photos. However, even when given instructions, patients frequently take photos of insufficient quality for clinical use. This is partially due to a lack of experience with what features clinicians care most about. Common quality issues include blurriness, poor lighting conditions, cropping of the area of interest, and too little or too much zoom.

Turning now to the drawings, systems and methods for automated clinical image quality assessment and uses thereof are provided. Many embodiments provide instructions and feedback for clinically relevant image quality. Several embodiments provide methods to generate a model to assess image quality.

Certain embodiments utilize a machine learning model to assess image quality and provide feedback to an individual to obtain images with better quality. Many embodiments comprise one or more deep learning models to provide a quality assessment, with some specific embodiments using an ensemble of deep learning and classical computer vision.

As noted above, photography is commonly used in a clinical setting for both educational purposes and to track disease progression in patients, especially in dermatology. However, several common issues exist in patient-provided imagery, including (but not limited to) skin lesion are is blurry, skin discoloration due to lighting conditions (e.g., dim environment, excessive shadows, excessive glare, background reflecting tinted light), skin lesion is cropped or taken too far from camera, image distortion (e.g., lens effects such as fish-eye), distracting background or accessories, and poor orientation (e.g., a leg is photographed horizontally, where a vertical photograph would include more of the leg in frame). To ensure high quality photos, several guidelines have been developed to counter the common issues that produce low quality photos in dermatology. However, even following the guidelines can still lead to photographs of poor quality and/or insufficient for clinical use.

Machine Learning Models

Many embodiments are directed to machine learning models capable of providing actionable information to provide medical imaging of increased quality for medical and/or clinical use. Various embodiments utilize one or more machine learning models. Some embodiments use an ensemble of deep learning models and classical computer vision algorithms. In some embodiments, the ensemble is a weighted sum across individual models' predictions. Output from such models can include one or more of: quantitative (e.g., 1-10 scale of quality), semi-quantitative (e.g., poor, fair, good, great), and/or qualitative (e.g., acceptable/unacceptable) feedback. Some embodiments provide a reasoning for unacceptable quality, including (but not limited to) "blurry," "lighting," and other issues poor quality. Further embodiments provide directed instructions on how to correct, mitigate, or otherwise resolve the cause(s) of poor quality.

In many embodiments, each deep-learning model is trained independently with a different random seed and/or with variations in hyperparameters. In certain embodiments, a final linear layer in the models is replaced with multiple linear classifiers (e.g., 2 classifiers, 3 classifiers, 4 classifiers, 5 classifiers, 10 classifiers, or more). Some specific embodiments utilize four linear classifiers. Such classifiers can be used to determine quality and reason for poor quality. In some embodiments, a first classifier acts as a gateway for other classifiers (e.g., if overall quality is "good," then the other classifiers are unnecessary). For example, a first classifier can provide a binary determination of good or poor overall quality, while any further classifiers provide good or poor determination for particular features (e.g., blur, lighting, zoom/crop, etc.).

Classical vision models in accordance with various embodiments, can include logistic classifiers, support vector machine classifiers, and random forest classifiers. In various embodiments, individual vision models are trained with the similar binary classification decisions, such as described in relation to deep learning models. Certain embodiments further provide features designed to differentiate poor quality images. Such features can include features based on local binary patterns of skin regions of the image and/or features based on featuring each region in an X by Y grid of the image, where the grid can be 1 by 1, 2 by 2, 3 by 3, 4 by 4, 5 by 5, 10 by 10, and/or any other grid of the image, including rectangular grids (e.g., 2 by 3, 4 by 5, etc.). Specific features can be selected via validation studies.

In the end, various embodiments of ensembled models can utilize multiple deep learning models and/or multiple classical vision models. For example, FIG. 1 illustrates a specific ensemble can utilize four deep learning models 102 (where each model is trained on the binary classifiers of good/poor overall, good/poor for blur, good/poor for lighting, and good/poor for zoom/crop) and six classic vision models 104. As illustrated the classical models can be trained based on selected features 106 and provide a simple classifier 108. The outputs of the models can be concatenated and analyzed by a logistic classifier 110. Output can be provided as a binary quality classification 112 (e.g., good or poor) and/or explanations for poor quality explanations 114.

Training Machine Learning Models

In various embodiments, deep learning models can be trained via various methods, including the use of pre-training and/or standard training. Certain embodiments utilize adversarial training methods in a pretraining methodology, such as 12 robust optimization. Such pretraining can be use ImageNet for pre-training. (See e.g., A. Krizhevsky, I. Sutskever, and G. E. Hinton, "Imagenet classification with deep convolutional neural networks," Adv. Neural Inf. Process. Syst., vol. 25, 2012; the disclosure of which is incorporated by reference herein in its entirety.)

Fine-tuning of a model can utilize a set of images with manually scored ratings to determine image quality. This pre-training can use a training data set can be preprocessed to a standard size (e.g., 128×128 pixels, 256×256 pixels, 512×512 pixels, etc.). Certain embodiments further obtain a center crop from the image, which represents the center of the image. Such crops can be any size up to the full size of the image, such as (but not limited to) 128×128 pixels or 256×256 pixels for a 512×512 pixel image. Certain embodiments comprising multiple models may use different center crop sizes for one or more of the models (e.g., in a four-model embodiment, two models can utilize a 128×128 pixel center crop, while the other two models may use a 256×256 pixel center crop). Certain embodiments utilize data augmentation strategies to improve model performance. Data augmentation can include random flips (horizontal and/or vertical), rotations, crops, and/or color jitter (e.g., small perturbations to brightness, contrast, and saturation).

For classical vision models, training can utilize different sets of features, such as the features described in Table 1. In some embodiments, features can be divided into different categories, such as:

Local binary patterns, Fourier blur, and lighting features. This category can be determined on various versions of the original image, such as:

A center crop that is 30% height and width of the original image, after transforming to grayscale color space A center crop that is 30% height and width of the output from a skin distribution classifier A center crop that is 60% height and width of the original image, after transforming to grayscale color space A center crop that is 60% height and width of the output from a skin distribution classifier Dividing the image into a grid (e.g., 2×2, 4×4, 5×5, etc.) and determining Fourier blur, Laplacian blur, and lighting features on each grid block.

In many embodiments, models utilize images obtained for the particular purpose, such as skin diseases, conditions, disorders, etc. In numerous embodiments, the images are annotated for quality via experts (e.g., dermatologists, surgeons, physicians, and/or any other person capable of judging photos for clinical relevance). In many such embodiments, photos are given an overall score based on the ability to make a clinical determination. Such scoring can be on a quantitative scale, such as provided in the example of Table 2. Images labeled as poor quality were also annotated with the reasons for poor quality—(1) blurriness, (2) lighting condition, (3) inadequate or excessive zoom and/or cropping of area of interest or (4) other.

By defining image quality based on clinical assessments, poor quality in background regions is generally acceptable and quality is relative to the type of lesion, rash, or other condition (e.g., by assessing quality, disease subgroups are implicitly classified).

Additional embodiments can include additional models for specific uses or functions. In particular, some embodiments may include the ability to semantically segment images to discriminate against skin/non-skin in an image. Additionally, while the above describes uses emphasizing dermatology, it should be noted that similar processes are adaptable to other uses, including ophthalmology, nutrition, gastroenterology, urology, and/or other subjects where patient-provided images can be utilized in the field.

Model Performance

Figure 2A:
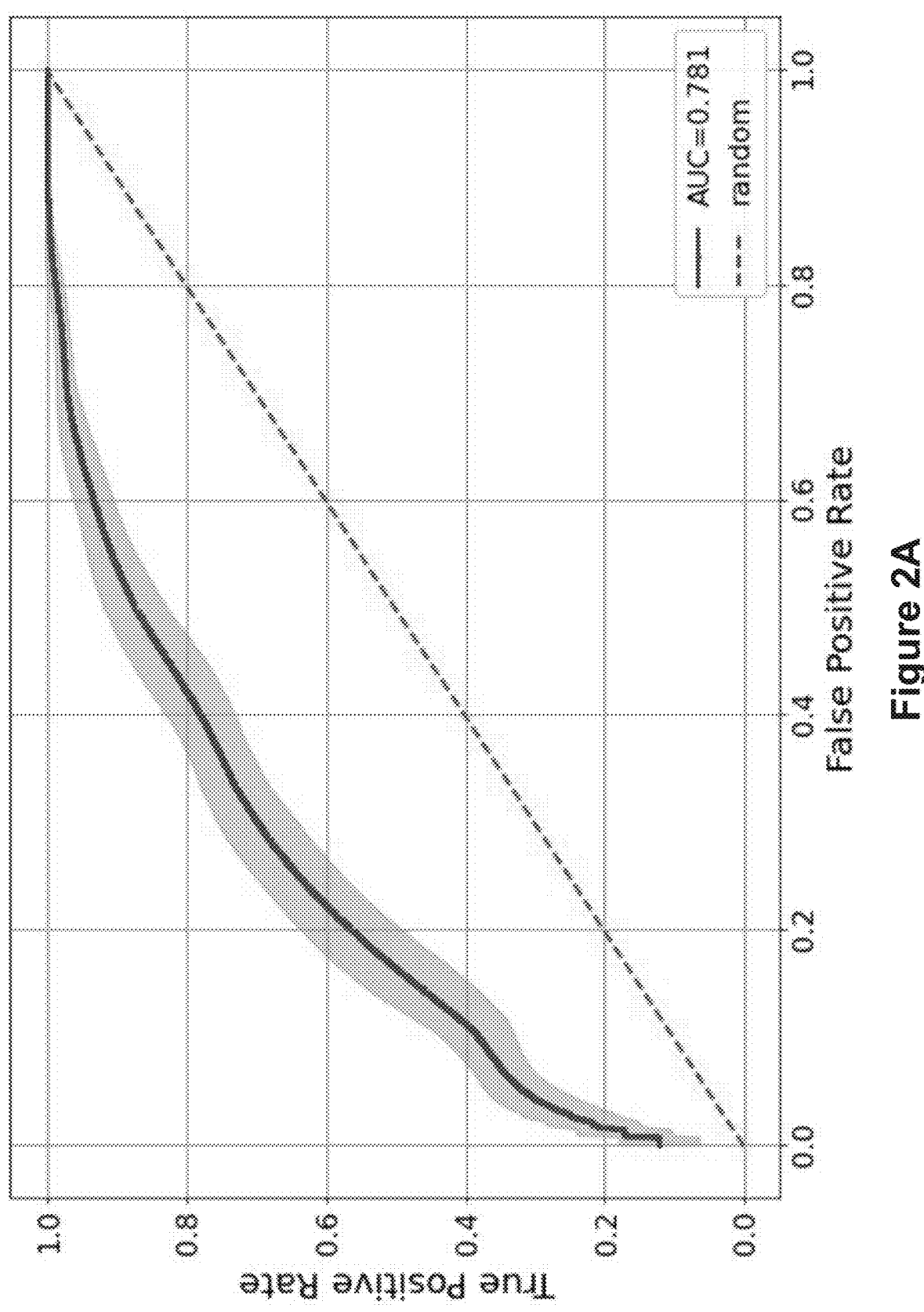
FIGS. 2A-2C provide exemplary AUC-ROC graphs of a retrospective analysis in accordance with various embodiments of the invention.
Figure 2B:
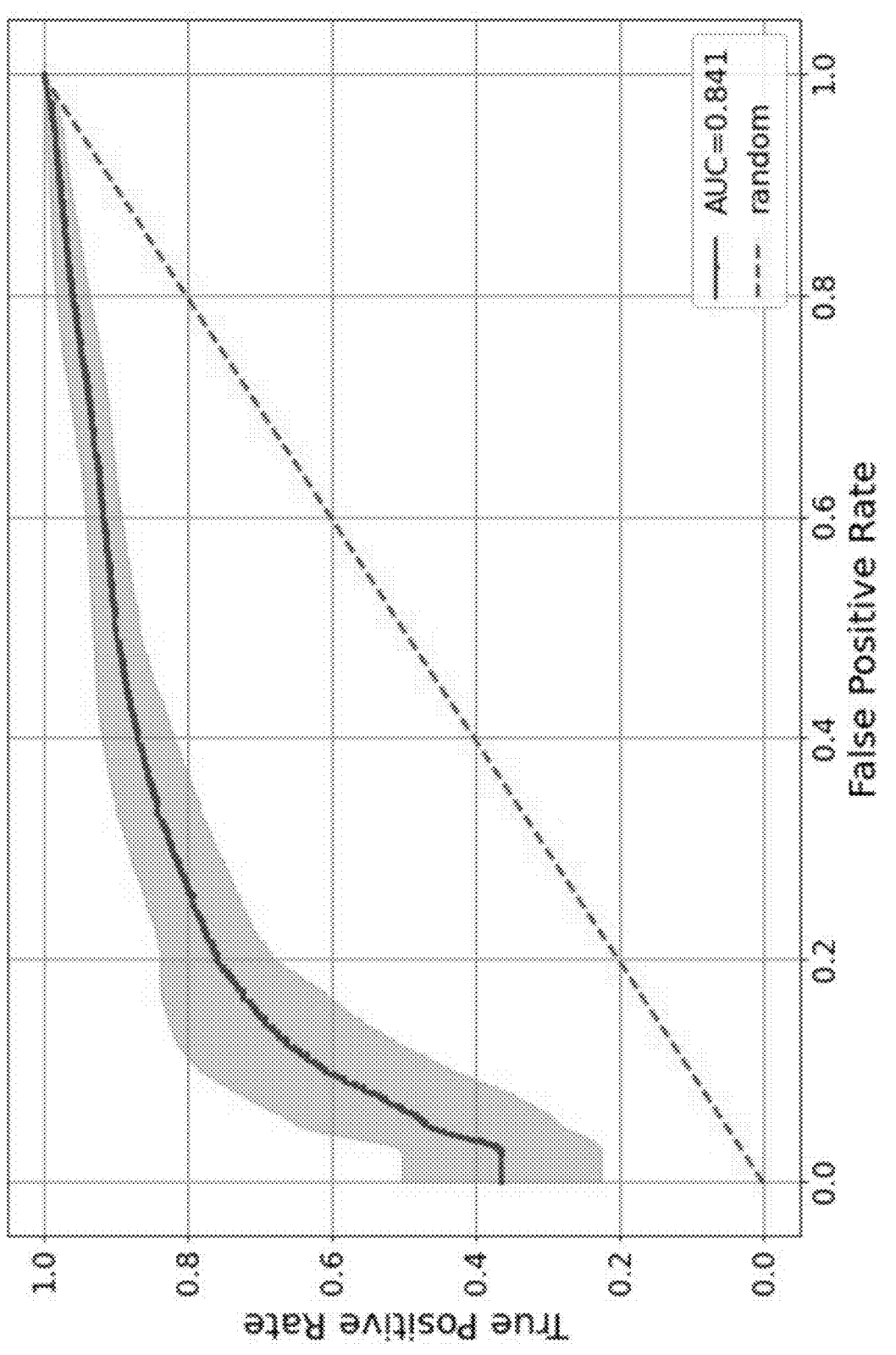
Figure 2C:
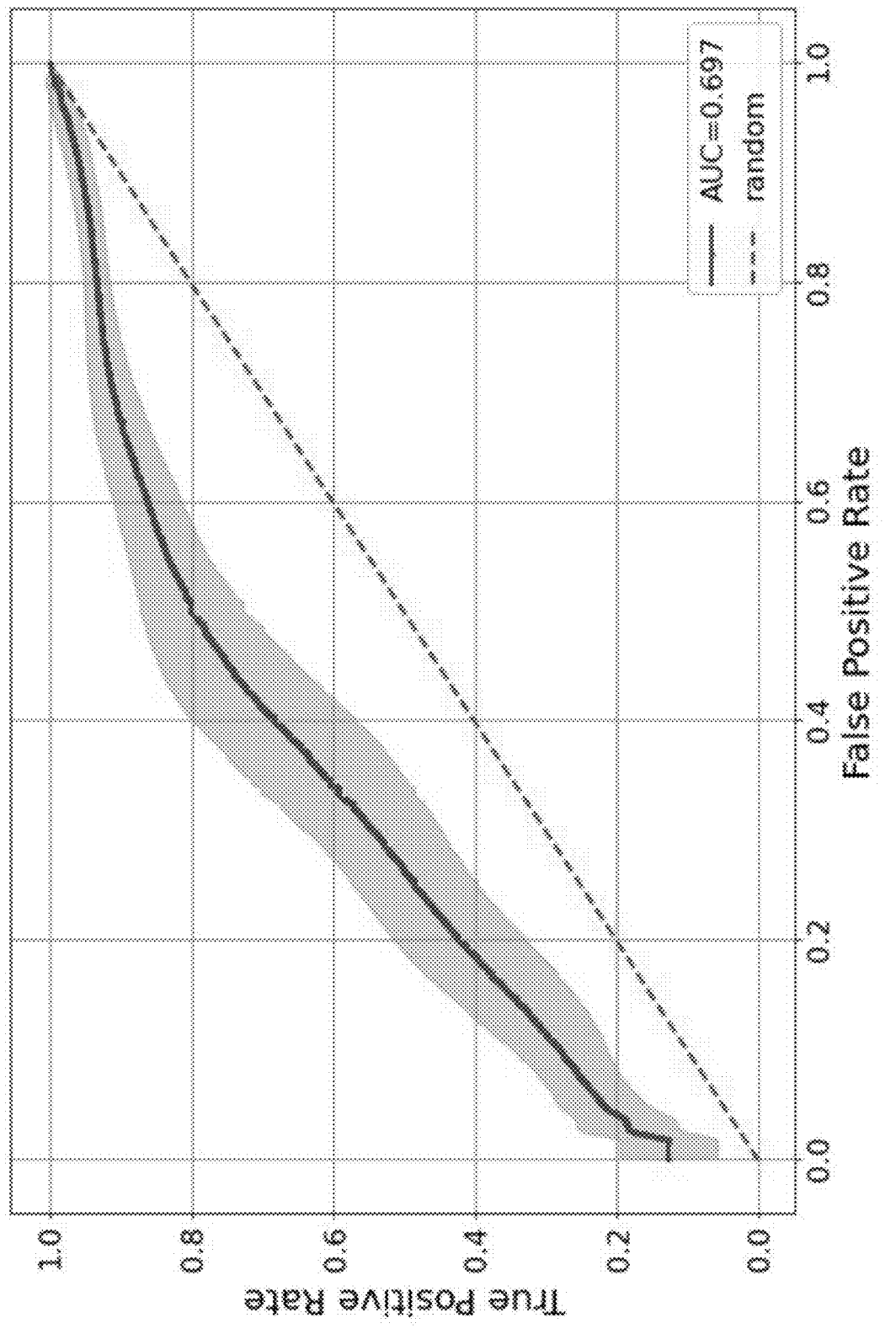

Many embodiments provide improved performance for image quality. Turning to FIGS. 2A-3C, exemplary data of certain embodiments are illustrated. Specifically, FIGS. 2A-2C illustrate AUC-ROC curves from a retrospective data evaluation, while FIGS. 3A-3C illustrate AUC-ROC curves of a clinical study.

Figure 3A:
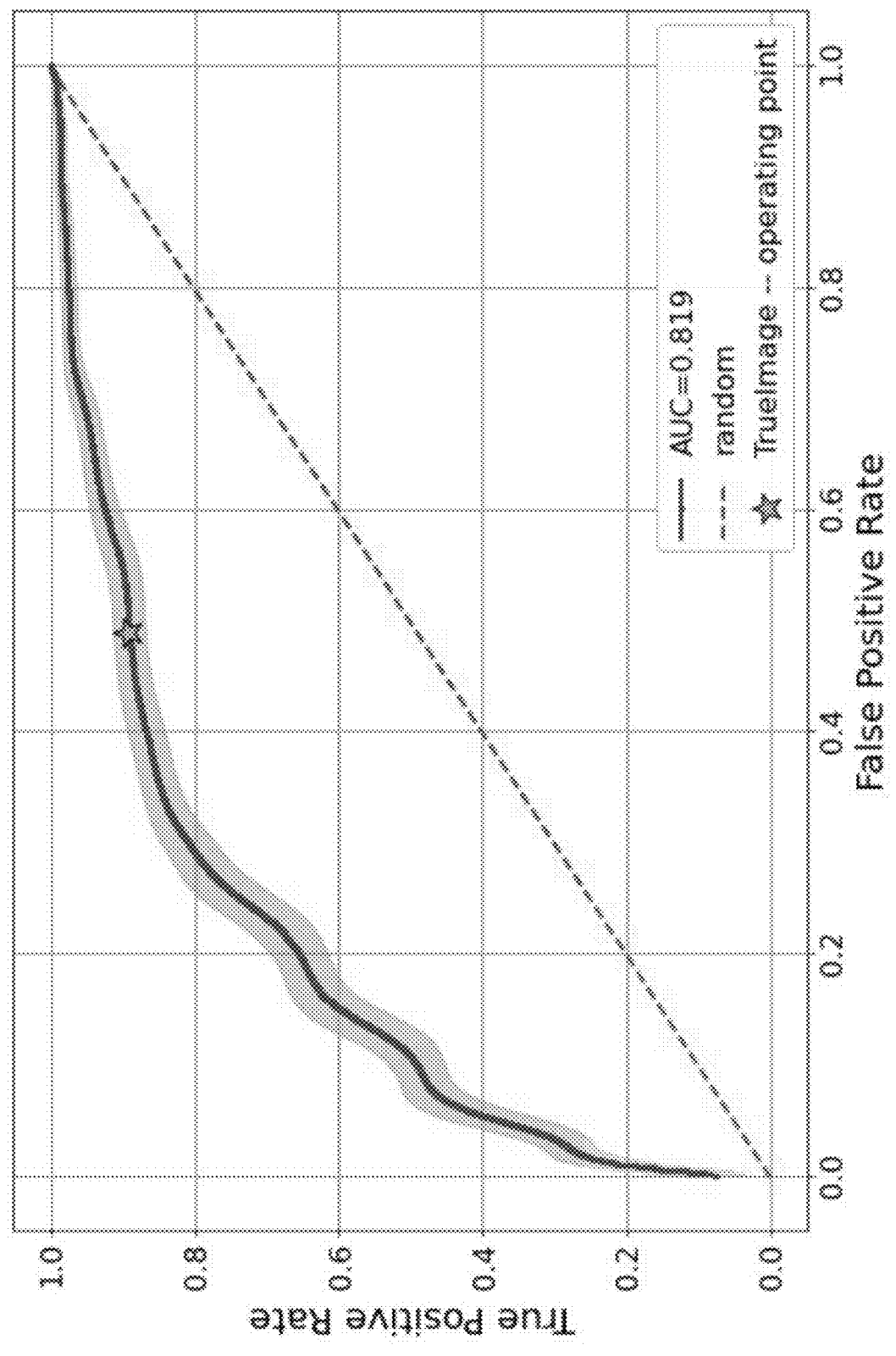
FIGS. 3A-3C provide exemplary AUC-ROC graphs of a clinical trial in accordance with various embodiments of the invention.
Figure 3B:
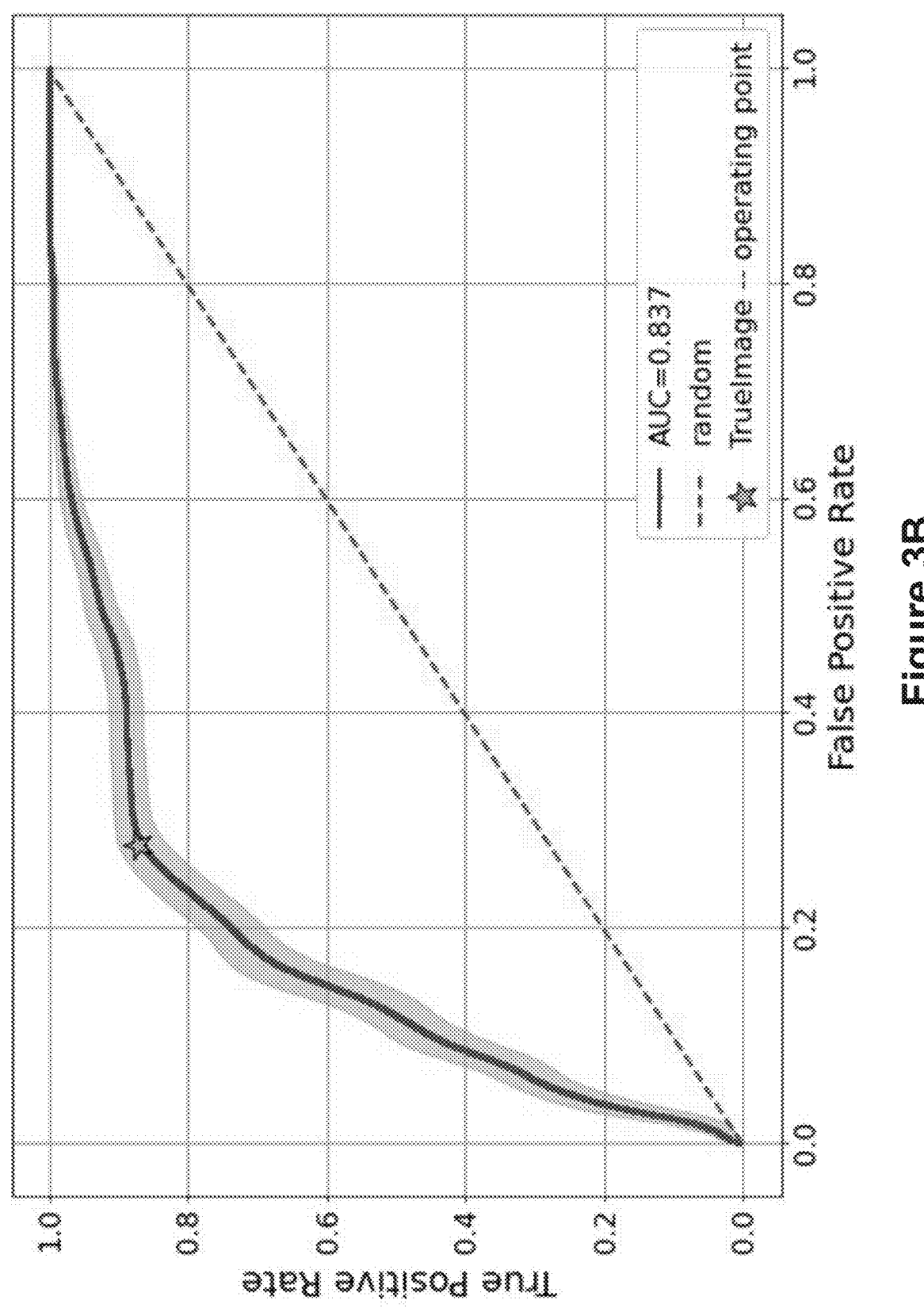
Figure 3C:
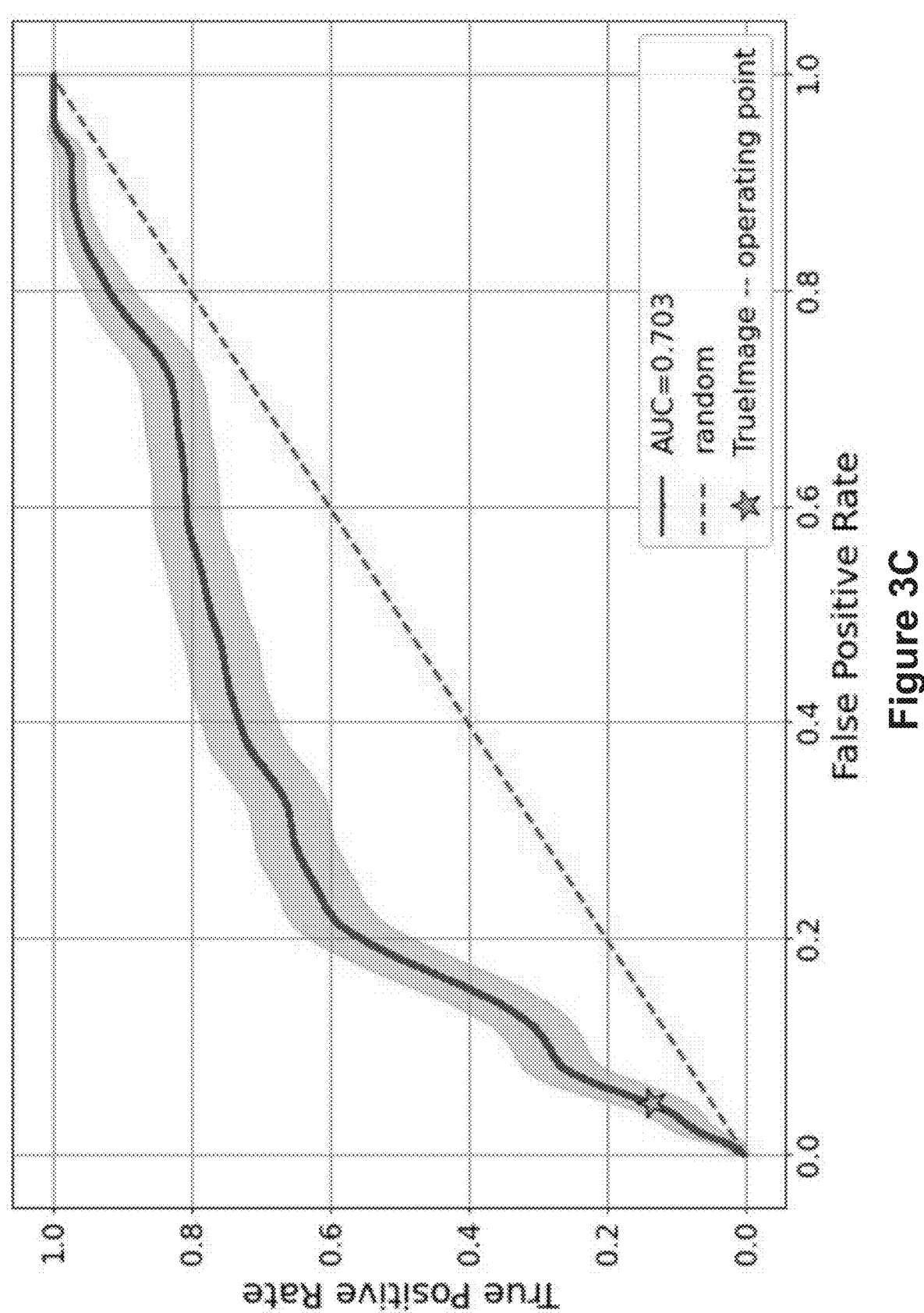

FIGS. 2A and 3A illustrate the exemplary AUC-ROC curves showing overall good quality images obtained by an exemplary embodiment, where the AUC is 0.781 and 0.819 in the retrospective and clinical studies respectively. Additionally, FIGS. 2B and 3B provide AUC-ROC for the blurry classifier, having AUC of 0.841 and 0.837 for retrospective analysis and a clinical trial, respectively. Finally, FIGS. 2C and 3C provide AUC-ROC curves for lighting issues, having AUC of 0.697 and 0.703 for retrospective analysis and a clinical trial, respectively.

Computer Executed Embodiments

Figure 4:
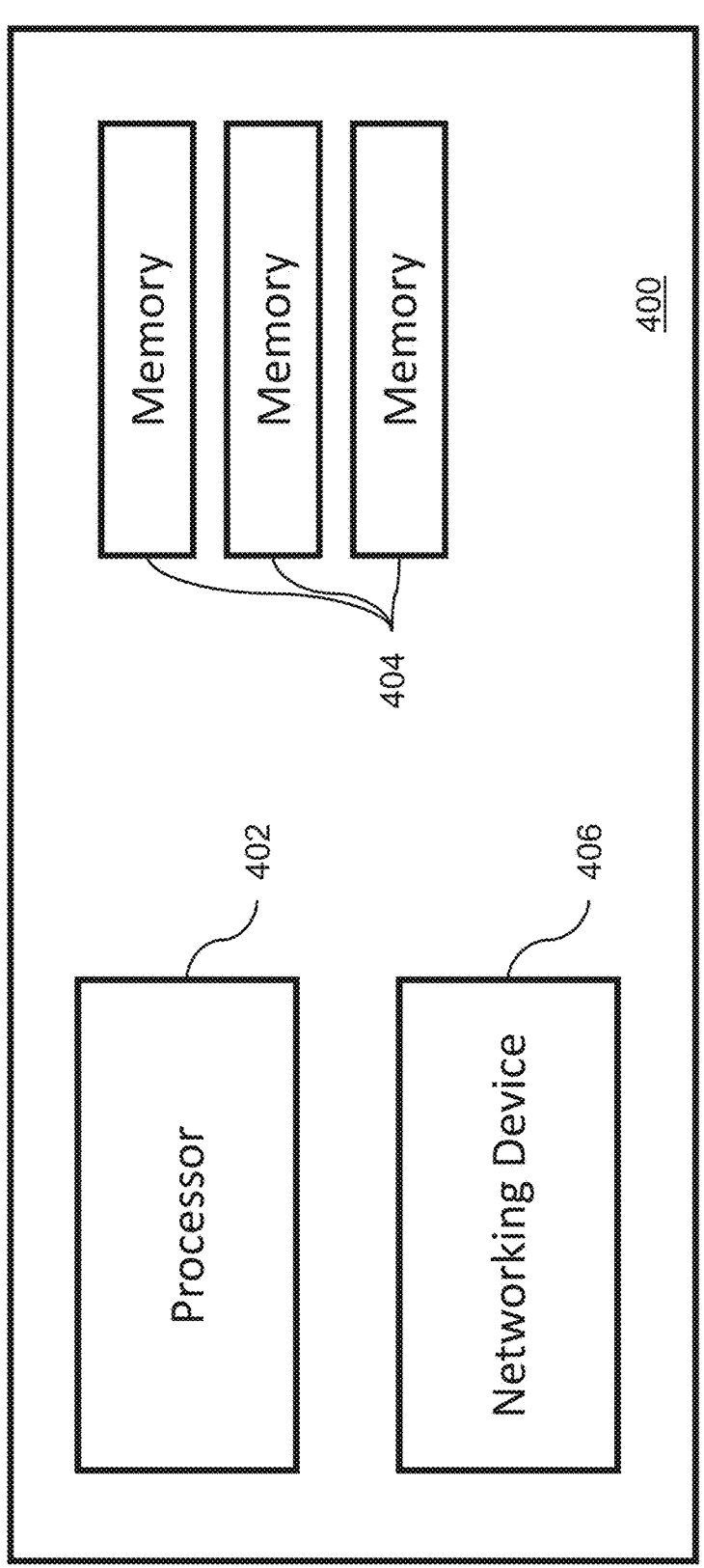
FIG. 4 illustrates a block diagram of components of a processing system in a computing device that can be used to assess image quality in accordance with various embodiments of the invention.

Processes that provide the methods and systems for determining image quality in accordance with some embodiments are executed by a computing device or computing system, such as a desktop computer, tablet, mobile device, laptop computer, notebook computer, server system, and/or any other device capable of performing one or more features, functions, methods, and/or steps as described herein. The relevant components in a computing device that can perform the processes in accordance with some embodiments are shown in FIG. 4. One skilled in the art will recognize that computing devices or systems may include other components that are omitted for brevity without departing from described embodiments. A computing device 400 in accordance with such embodiments comprises a processor 402 and at least one memory 404. Memory 404 can be a non-volatile memory and/or a volatile memory, and the processor 402 is a processor, microprocessor, controller, or a combination of processors, microprocessor, and/or controllers that performs instructions stored in memory 404. Such instructions stored in the memory 404, when executed by the processor, can direct the processor, to perform one or more features, functions, methods, and/or steps as described herein. Any input information or data can be stored in the memory 404—either the same memory or another memory. In accordance with various other embodiments, the computing device 400 may have hardware and/or firmware that can include the instructions and/or perform these processes.

Certain embodiments can include a networking device 406 to allow communication (wired, wireless, etc.) to another device, such as through a network, near-field communication, Bluetooth, infrared, radio frequency, and/or any other suitable communication system. Such systems can be beneficial for receiving data, information, or input (e.g., images) from another computing device and/or for transmitting data, information, or output (e.g., quality score, rating, etc.) to another device. In various embodiments, the networking device can be used to send and/or receive update models, interfaces, etc. to a user device.

Figure 5:
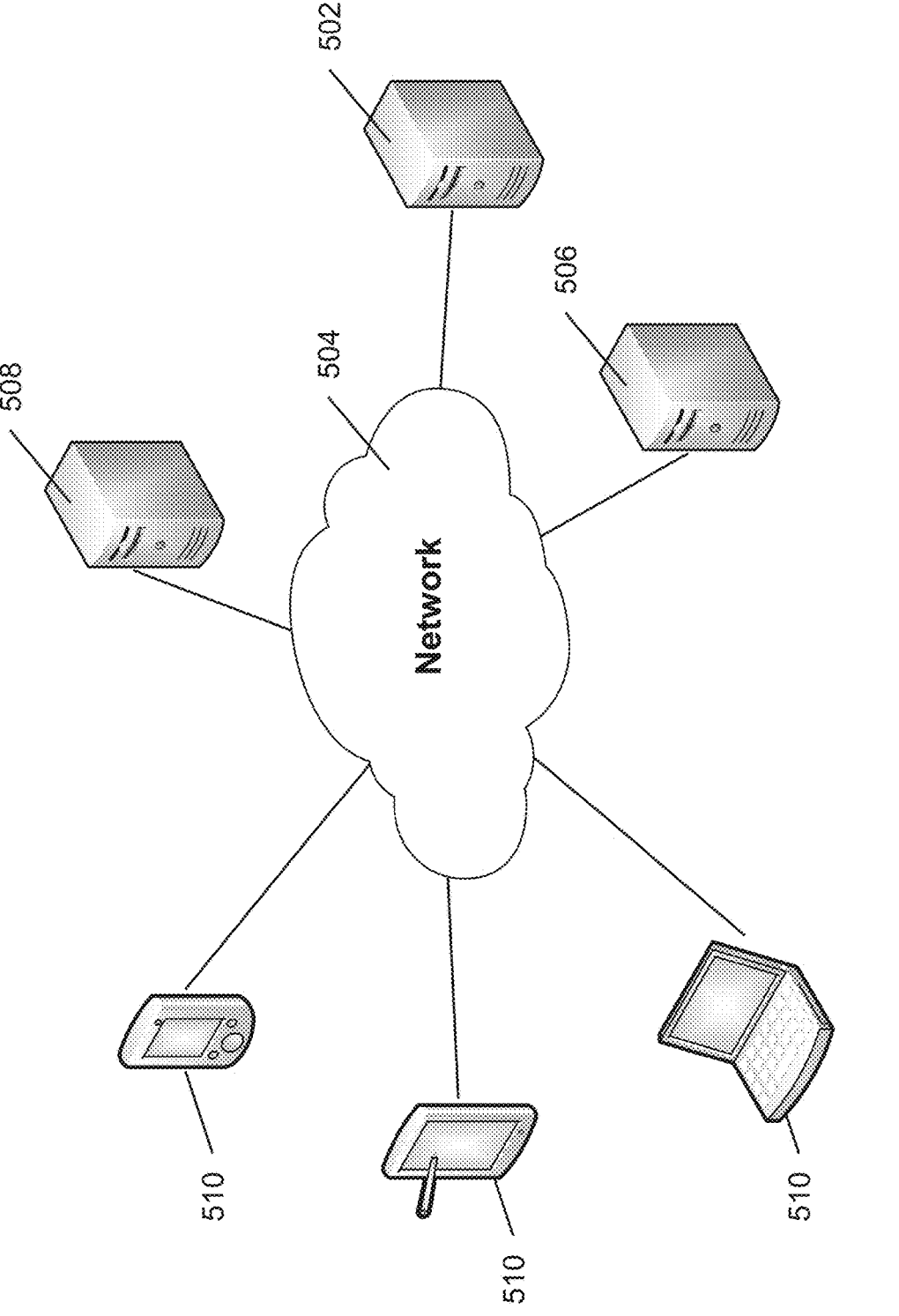
FIG. 5 illustrates a network diagram of a distributed system to assess image quality in accordance with various embodiments of the invention.

Turning to FIG. 5, an embodiment with distributed computing devices is illustrated. Such embodiments may be useful where computing power is not possible at a local level, and a central computing device (e.g., server) performs one or more features, functions, methods, and/or steps described herein. In such embodiments, a computing device 502 (e.g., server) is connected to a network 504 (wired and/or wireless), where it can receive inputs from one or more computing devices, including data from a records database or repository 506, data provided from a laboratory computing device 508, and/or any other relevant information from one or more other remote devices 510. Once computing device 502 performs one or more features, functions, methods, and/or steps described herein, any outputs can be transmitted to one or more computing devices 506, 508, 510 for entering into records.

In accordance with still other embodiments, the instructions for the processes can be stored in any of a variety of non-transitory computer readable media appropriate to a specific application.

Methods to Assess Image Quality

Figure 6:
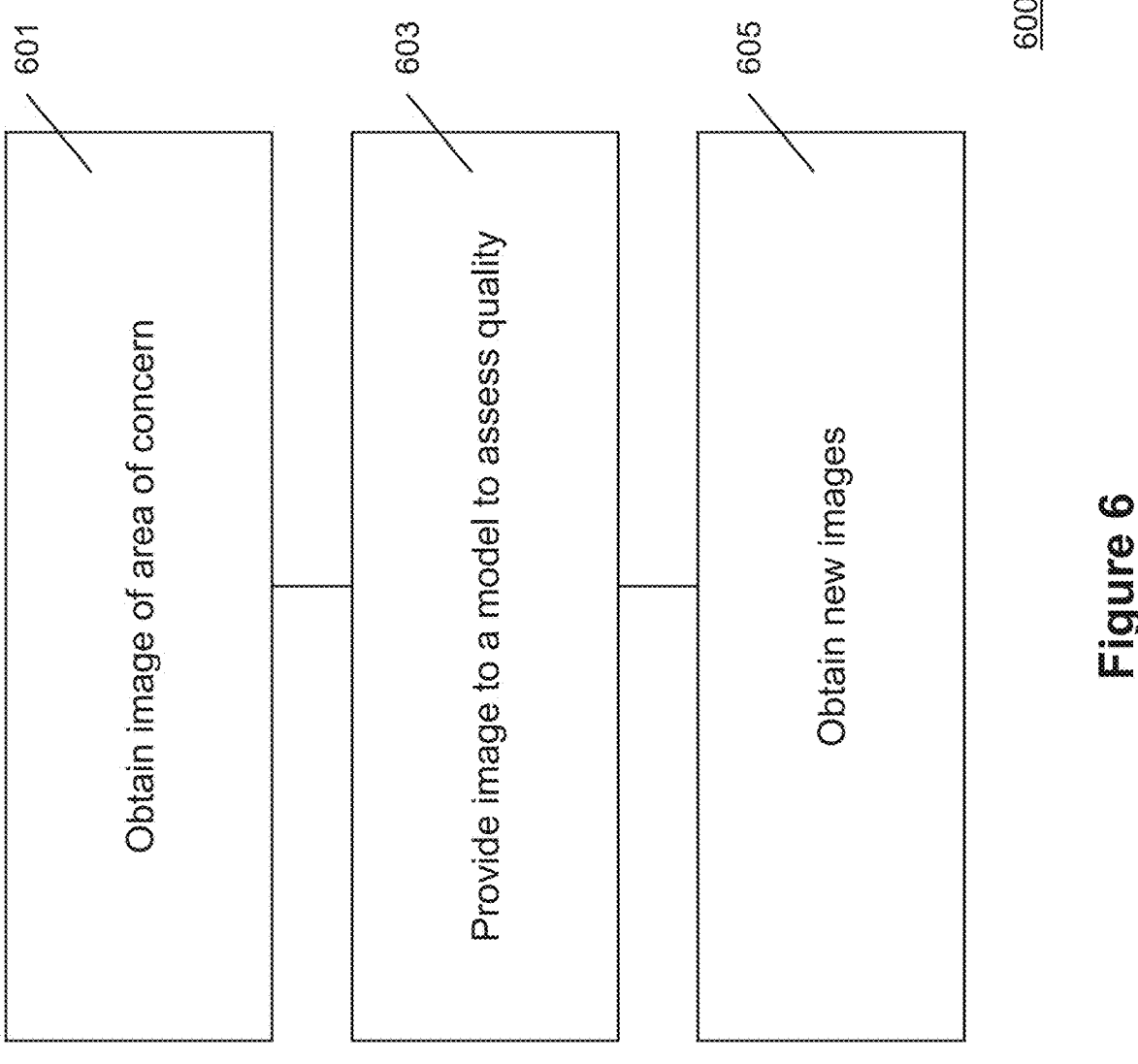
FIG. 6 provides an exemplary method for assessing image quality in accordance with various embodiments of the invention.

Many embodiments are directed to assessing and/or improving image quality. As noted herein, image quality can be focused on clinical relevance, clinical use, and/or any other metric that provides a clinician or other medical professional better images for diagnostic or clinical use. FIG. 6 provides a flow chart of an exemplary method 600 to assess and/or improve image quality, in accordance with various embodiments.

At 601, many embodiments obtain an image of an area of concern. In many embodiments, the area of concern is a skin lesion or other mark on the derma of an individual. Various embodiments obtain the image using a computing device, including a mobile phone, tablet, computer, or other computing device including a camera. In many embodiments, the individual with the area of concern takes a photograph of the area, while in some embodiments another individual takes a photograph, such as if the area of concern is in a difficult to reach location.

Further embodiments provide the image to a model to assess image quality at 603. In some embodiments, the assessment occurs on a remote computing system, while other embodiments assess quality locally (e.g., on the computing device where the image is obtained). As noted herein, models can provide image scores and quality classifiers (e.g., too blurry, etc.) to the user. In some embodiments, solutions, instructions, or suggestions to resolve the quality issues can also be provided to the user (e.g., increase lighting, focus on area of concern, move camera closer/further, etc.).

Users can obtain and provide new images at 607. Such images can be in response to any feedback provided to the user in 603, such as obtaining images with better lighting, focus, etc. In such embodiments, the process can be obtained in an iterative fashion until images with clinically relevant quality are obtained.

It should be noted that various embodiments can vary from the features described above, such as adding, omitting, and/or duplicating some features. Additionally, some features may be performed in a different order, simultaneously, and/or in an overlapping fashion (e.g., when one feature begins before another feature ends, when one feature begins and ends while another feature is still ongoing, etc.)

DOCTRINE OF EQUIVALENTS

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the foregoing examples and descriptions of various preferred embodiments of the present invention are merely illustrative of the invention as a whole, and that variations in the components or steps of the present invention may be made within the spirit and scope of the invention. Accordingly, the present invention is not limited to the specific embodiments described herein, but, rather, is defined by the scope of the appended claims.

TABLE 1

Description of featurization methods

| Method Name | Description |
| --- | --- |
| Local Binary Pattern | A local binary pattern is a short descriptor for a given pixel, based on whether a given pixel has larger or smaller magnitude than nearby pixels. We compute a histogram of these local binary patterns for a given image to give a measure of what types of pixels are present in the image. This gives a general description that is useful for quality assessment. |
| Fourier Blur | The mean and standard deviation of the 2D Discrete Fourier Transform of an image in dB (20 * log(x)), after filtering out the low frequency component. Provides a measure of the high frequency components in the image to determine the amount of blur. |
| Laplacian Blur | The variance of the Laplacian of the image. Provides a measure of how much adjacent pixels vary to determine the amount of blur. |
| Lighting | By defining two thresholds for pixels, 50 and 305 (pixels range from 0 to 355). Pixels are divided into three groups by partitioning [0, 355] according to these thresholds. Then the 25th, 50th, and 75th quantiles are computed for the [0, 50) and (305, 355] groups. These provide measures of how many dark or light the image region is. |
| Skin Distribution | A Gaussian Mixture Model was trained to predict skin/non-skin from individual pixels using the Skin Segmentation Dataset on the UCI Model Repository. In this step, we generate a probability each pixel is skin given an input image. |
| Image Cropping | Selecting various patches of the image (e.g., a center crop) to use for featurization of a specific area in the image. |
| Color Space Transform | RGB colors are transformed to grayscale before computing some features. |

TABLE 2

Photo quality scale for annotating clinical dermatology images

| Quality Rating | Description |
| --- | --- |
| 0 | Crisp, clear, perfect photo |
| 1 | Generally good quality with minor imperfections, |

TABLE 2-continued

Photo quality scale for annotating clinical dermatology images

| Quality Rating | Description |
| --- | --- |
| | but can tell what is happening |
| 2 | Quality is not great, but possible to tell what is going on |
| 3 | Can barely discern what is happening in the photo |
| 4 | Cannot tell what is going on in the photo |

Larger values indicate lower quality. "Poor quality" was defined by a quality rating >1.

What is claimed is:

1. A machine learning model for assessing image quality, comprising:
   a deep learning model comprising a linear classifier configured to identify image quality of an image;
   a classical vision model configured to identify a feature quality in the image; and
   a logistic classifier configured to provide an image quality as an output.

2. The machine learning model of claim 1, wherein the deep learning model is a plurality of deep learning models, wherein one deep learning model provides an overall quality of the image and another deep learning model provides a binary classifier for a feature of the image.

3. The machine learning model of claim 2, wherein the feature is selected from blur, lighting, and zoom/crop.

4. The machine learning model of claim 1, wherein the deep learning model is four deep learning models, wherein the first deep learning model provides an overall quality of the image and the second deep learning model, the third deep learning model, and the fourth deep learning models provide a binary classifier for a feature of the image.

5. The machine learning model of claim 4, wherein the feature is selected from blur, lighting, and zoom/crop.

6. The machine learning model of claim 4, wherein the first deep learning model is a gateway classifier.

7. The machine learning model of claim 1, wherein the classical vision model is a plurality of classical vision models.

8. The machine learning model of claim 7, wherein the plurality of classical vision models are input selected features.

9. The machine learning model of claim 8, wherein the features are selected by one or more of: local binary pattern, Fourier blur, Laplacian blur, Lighting, skin distribution, image cropping, and color space transform.

10. The machine learning model of claim 1, wherein the logistic classifier is further configured to provide an explanation for a poor quality image.

11. The machine learning model of claim 1:

wherein the deep learning model is four deep learning models, wherein the first deep learning model provides an overall quality of the image, wherein the second deep learning model, the third deep learning model, and the fourth deep learning models provide a binary classifier for a feature of the image, wherein the feature is selected from blur, lighting, and zoom/crop, and wherein the first deep learning model is a gateway classifier;

wherein the classical vision model is a plurality of classical vision models input selected features, wherein the features are selected by one or more of: local binary pattern, Fourier blur, Laplacian blur, Lighting, skin distribution, image cropping, and color space transform; and wherein the logistic classifier is configured to provide an explanation for a poor quality image.

12. A method for improving image quality for clinical use, comprising:

obtaining an image of an area of concern on an individual;

providing the image to a machine learning model trained to identify image quality, where the machine learning model comprises:

a deep learning model comprising a linear classifier configured to identify image quality of the image;

a classical vision model configured to identify a feature quality in the image; and a logistic classifier configured to provide an image quality as an output; and receiving an image quality rating for the image from the machine learning model.

13. The method of claim 12, wherein the area of concern is a skin lesion.

14. The method of claim 12, further comprising:

obtaining a second image of the area of concern based on the image quality rating from the machine learning model;

providing the second image to the machine learning model; and receiving an image quality rating for the second image from the machine learning model.

15. The machine learning model of claim 12, wherein the deep learning model is a plurality of deep learning models, wherein one deep learning model provides an overall quality of the image and another deep learning model provides a binary classifier for a feature of the image.

16. The machine learning model of claim 15, wherein the feature is selected from blur, lighting, and zoom/crop.

17. The machine learning model of claim 12, wherein the deep learning model is four deep learning models, wherein the first deep learning model provides an overall quality of the image and the second deep learning model, the third deep learning model, and the fourth deep learning models provide a binary classifier for a feature of the image.

18. The machine learning model of claim 17, wherein the feature is selected from blur, lighting, and zoom/crop.

19. The machine learning model of claim 12, wherein the logistic classifier is further configured to provide an explanation for a poor quality image.

* * * * *